UNITED STATES PATENT OFFICE.

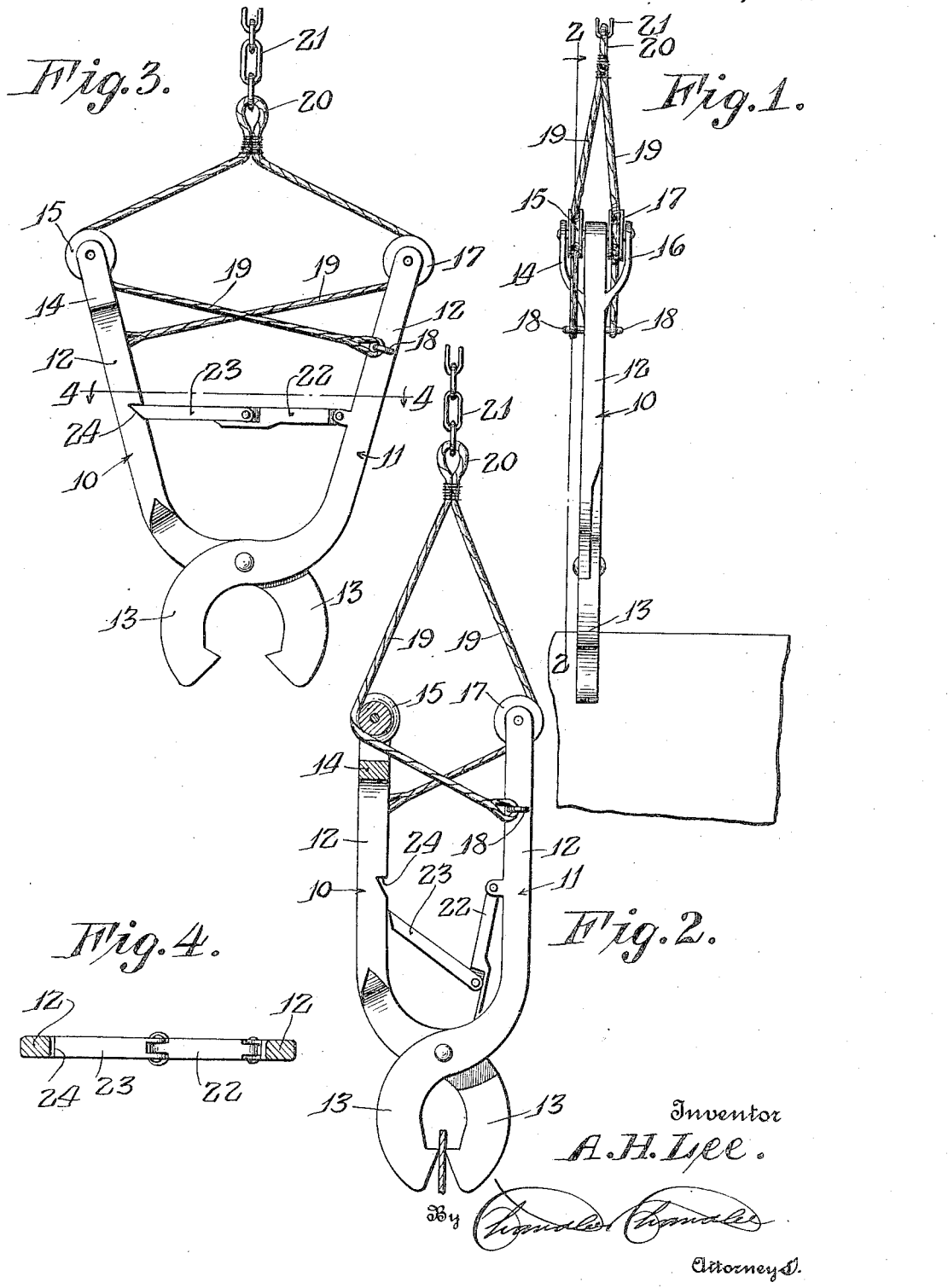

ALBERT H. LEE, OF PORTLAND, OREGON.

TONGS.

1,343,057.  Specification of Letters Patent.  Patented June 8, 1920.

Application filed May 29, 1919. Serial No. 300,591.

*To all whom it may concern:*

Be it known that I, ALBERT H. LEE, a citizen of the United States, residing at Portland, in the county of Multnomah, State of Oregon, have invented certain new and useful Improvements in Tongs; and I do hereby declare the following to be a full, clear, and exact description of the invention, such as will enable others skilled in the art to which it appertains to make and use the same.

This invention relates to hoisting, and more especially to grapples or tongs for lifting and carrying metal plates or like objects.

The primary object of the invention is to provide a pair of tongs of this construction with a special form of spreader between its arms to hold them open until the moment arrives when the jaws are to close onto the article to be gripped, when a sudden blow or pull on such spreader will collapse it as explained below.

Other objects and advantages will be apparent from the following description when taken in connection with the accompanying drawing.

In the drawing:

Figure 1 is an elevation of a pair of the tongs made in accordance with my invention, shown as suspending a plate.

Fig. 2 is a vertical sectional view taken on the line 2—2 of Fig. 1, showing the tongs in side elevation.

Fig. 3 is a side elevation of the tongs showing the spreader for holding the jaws apart.

Fig. 4 is a horizontal sectional view taken on the line 4—4 of Fig. 2, looking downwardly in the direction of the arrows, to show the construction of the spreader.

Referring particularly to the accompanying drawing, 10 and 11 represent a pair of crossed and pivoted members each having a shank portion and a jaw portion, represented respectively at 12 and 13. On one side of the upper end of the shank 12 there is secured a loop 14 in which is mounted a grooved roller 15, and on the same end of the other shank 12, but on the opposite side thereof, there is secured a similar loop 16 carrying a similar grooved roller 17. On the intermediate portion of each of the shanks there is secured an eye 18, and connected to these eyes are the ends of two stretches of a cable or chain 19, the stretches being crossed and passed around the respectively opposite rollers, as shown. Carried by the intermediate portion of the cable or chain 19, is a loop or ring 20 to which is connected the suspension chain 21, leading to an overhead or elevated carrier, not shown. Pivotally carried by one of the shanks 12 is the outer end of one arm 22 of a spreader, and pivotally connected to the inner end of this arm is a second arm 23, the outer end of which is adapted to engage in a notch 24 formed in the corresponding portion of the other shank 12. The connection between the arms 22 and 23 is by the way of a knuckle joint so disposed that when said arms are in alinement the said connection will not move until forced downward by pressure thereon. Thus, when the arm 23 is engaged in the notch 24 and the arms stand in longitudinal alinement, the members of the tongs will be held distended and the jaws will remain open and may be readily and easily engaged in straddling relation with the plate which is to be lifted and carried. Then upon breaking the spreader by a blow or pull on the knuckle joint between the arms 22 and 23, the cable or chain 19 will exert pressure on the shanks 12 to draw them together and consequently close the jaws on the plate. The spreader now falls into inactive position within the tongs as seen in Fig. 2, completely out of the way until occasion arises for its use again. The weight of the plate, by contact with the jaws will cause the jaws to engage with a firm and strong grip so that the plate will not slip from between them.

It will be understood that there will be two of these tongs used in connection with a carrier or crane whereby the plate which is being carried will not swing around during transit.

What is claimed is:

A pair of lifting tongs comprising two members crossing and pivoted to each other and having shanks at their upper ends and jaws at their lower ends, and a lifting cable having branches connected with the respective shanks; combined with a spreader composed of two arms connected end to end by a knuckle joint, and means for pivoting the outer end of one arm to one shank, the inner edge of the opposite shank having a notch for receiving the outer end of the other arm, whereby inward pressure of said shanks will hold the arms alined, as described.

In testimony whereof, I affix my signature, in the presence of two witnesses.

ALBERT H. LEE.

Witnesses:
SAMUEL OLSON,
Q. H. WARD.